United States Patent [19]

Shimada

[11] Patent Number: 5,434,858
[45] Date of Patent: Jul. 18, 1995

[54] VIRTUAL TRIBUTARY PATH IDLE INSERTION USING TIMESLOT INTERCHANGE

[75] Inventor: Naohiro Shimada, Tokyo, Japan

[73] Assignee: NEC Corporation, Tokyo, Japan

[21] Appl. No.: 203,689

[22] Filed: Feb. 28, 1994

Related U.S. Application Data

[63] Continuation of Ser. No. 937,582, Aug. 28, 1992, abandoned.

[30] Foreign Application Priority Data

Aug. 30, 1991 [JP] Japan ............................ 3-220295

[51] Int. Cl.⁶ ............................................. H04J 3/12
[52] U.S. Cl. ............................... 370/68.1; 370/110.1; 370/102
[58] Field of Search ......... 370/68, 68.1, 60, 58.1-58.3, 370/112, 110.1, 84, 94.1, 102, 105.1, 94.2; 375/112

[56] References Cited

U.S. PATENT DOCUMENTS

| | | | |
|---|---|---|---|
| 4,967,405 | 10/1990 | Upp et al. | 370/84 |
| 4,999,832 | 3/1991 | Chen et al. | 85/14 |
| 5,060,229 | 10/1991 | Tyrell et al. | 370/112 |
| 5,099,475 | 3/1992 | Kozaki et al. | 370/95.1 |
| 5,144,297 | 9/1992 | Ohara | 370/84 |
| 5,144,620 | 9/1992 | Ishizaki et al. | 370/84 |
| 5,265,090 | 11/1993 | Guinand et al. | 370/112 |

OTHER PUBLICATIONS

E. Knapp, Globecom 89, vol. 3, Nov. 1989, pp. 1488-1494.
R. Ballart et al., "Sonet: Now It's the Standard Optical Network" *IEEE Communications Magazine*, vol. 29, No. 3, Mar. 1989, pp. 8-15.
H. Yamashita et al., "Flexible Synchronous Broad--Band Subscriber Loop System: Optical Shuttle Bus", *Journal of Lightwave Technology*, vol. 7, No. 11, Nov. 1989, pp. 1788-1797.

*Primary Examiner*—Douglas W. Olms
*Assistant Examiner*—Chau T. Nguyen
*Attorney, Agent, or Firm*—Ostrolenk, Faber, Gerb & Soffen

[57] ABSTRACT

In a terminating station for a synchronous multiplex transmission network in which a frame of i rows and j columns is transmitted, the j columns of the frame is divided into k+m columns, with the k columns carrying a transport overhead and the m columns carrying an information payload. The m columns are subdivided into k groups of n columns each, and each of the corresponding n columns of each group carries a virtual tributary traffic. In the terminating station, a virtual tributary path idle (VTPI) pulse sequence is generated and inserted into the k columns of each frame. A timeslot interchanger, which provides the usual timeslot interchange within the frame, copies the contents of the k columns of the frame into one or more of the n columns of the k groups, respectively, of the same frame.

4 Claims, 4 Drawing Sheets

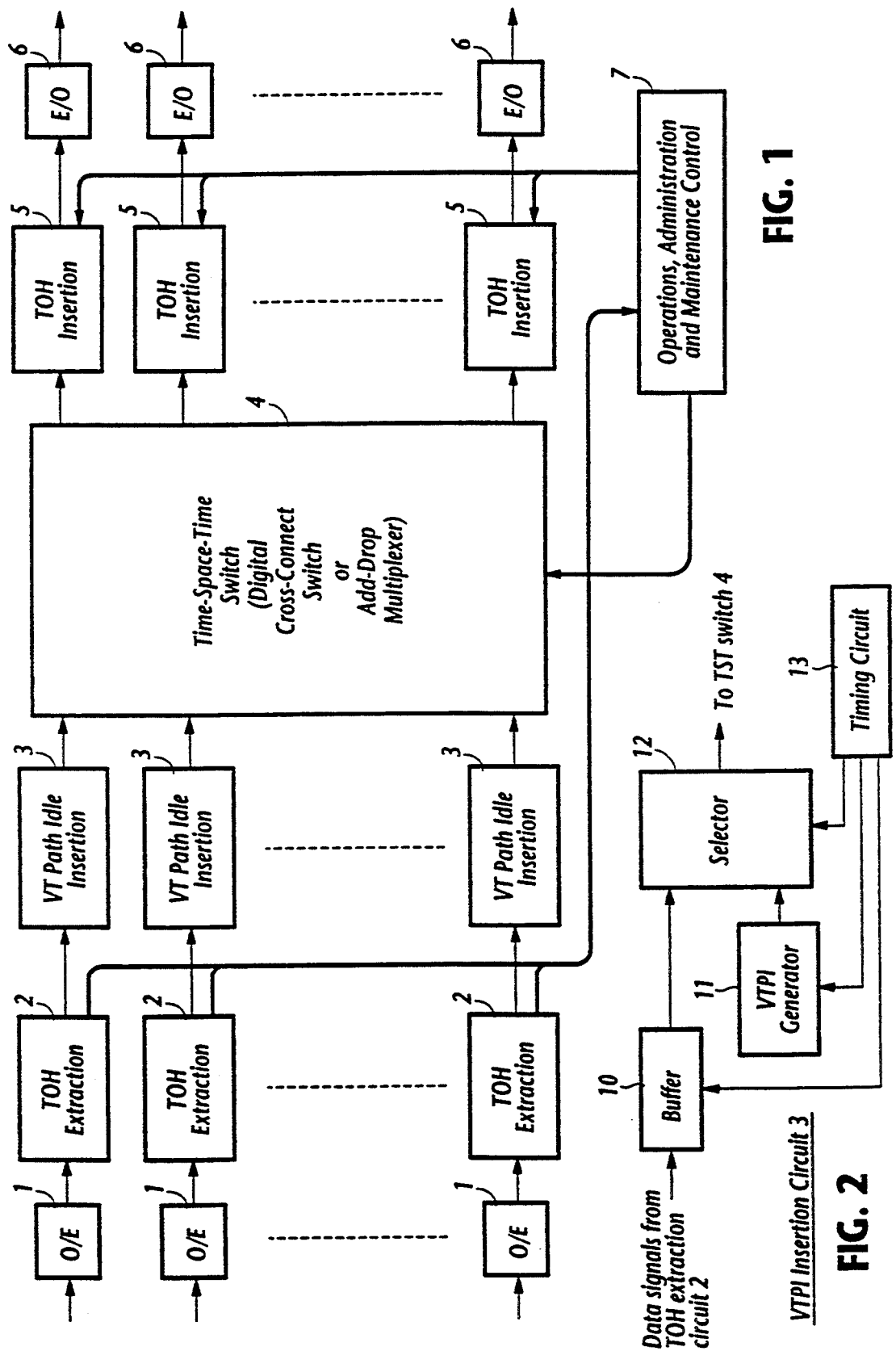

FIG. 3A

Frame #1

$V_1 = 01101100$
$0 = 00000000$

| | | | |
|---|---|---|---|
| 0 | 0 | 0 | |
| 0 | 0 | 0 | |
| 0 | 0 | 0 | |
| $V_1$ | 0 | 0 | J1 |
| 0 | 0 | 0 | |
| 0 | 0 | 0 | |
| 0 | 0 | 0 | |
| 0 | 0 | 0 | |
| 0 | 0 | 0 | H4 |

⟵ TOH ⟶ / \POH \ ⟵ SPE ⟶

FIG. 3B

Frame #2

$V_2 = 00000000$

| | | | |
|---|---|---|---|
| 0 | 0 | 0 | |
| 0 | 0 | 0 | |
| 0 | 0 | 0 | |
| $V_2$ | 0 | 0 | J1 |
| 0 | 0 | 0 | |
| 0 | 0 | 0 | |
| 0 | 0 | 0 | |
| 0 | 0 | 0 | |
| 0 | 0 | 0 | H4 |

FIG. 3C

Frame #3

$V_3 = 00000000$

| | | | |
|---|---|---|---|
| 0 | 0 | 0 | |
| 0 | 0 | 0 | |
| 0 | 0 | 0 | |
| $V_3$ | 0 | 0 | J1 |
| 0 | 0 | 0 | |
| 0 | 0 | 0 | |
| 0 | 0 | 0 | |
| 0 | 0 | 0 | |
| 0 | 0 | 0 | H4 |

FIG. 3D

Frame #4

$V_4 = 00000000$

| | | | |
|---|---|---|---|
| 0 | 0 | 0 | |
| 0 | 0 | 0 | |
| 0 | 0 | 0 | |
| $V_4$ | 0 | 0 | J1 |
| 0 | 0 | 0 | |
| 0 | 0 | 0 | |
| 0 | 0 | 0 | |
| 0 | 0 | 0 | |
| 0 | 0 | 0 | H4 |

VIRTUAL TRIBUTARY PATH IDLE INSERTION USING TIMESLOT INTERCHANGE

This is a Continuation of application Ser. No. 07/937,582 filed on Aug. 28, 1992, abandoned.

BACKGROUND OF THE INVENTION

The present invention relates generally to synchronous transmission systems, and more specifically to the insertion of a virtual tributary path idle (VTPI) code into a multiplex signal.

According to CCITT Recommendation G709, it is specified that a virtual tributary path idle (VTPI) signal be inserted to a STS-1 (synchronous transport signal level-1) frame if at least one of the virtual tributaries of the frame carries no data signals. A conventional technique for the VTPI insertion involves the use of a set of a VTPI generator and a selector for each virtual tributary for generating a VTPI and combining it with data bits.

Since the current approach needs as many sets of VTPI generator and selector as there are virtual tributaries, it results in circuit complexity and an increase in terminal equipment size and cost.

SUMMARY OF THE INVENTION

It is therefore an object of the present invention to provide a VTPI insertion technique which requires a single VTPI insertion circuit for multiple virtual tributary paths.

The present invention is based on the fact that a portion of a frame where a transport overhead has been inserted is not used by the current technique when timeslots are interchanged. To minimize the number of VTPI insertion circuits, the present invention uses this portion of a frame as a temporary storage area for a VTPI signal and allows the timeslot interchanging function to copy the stored signal into other portions of the frame which are assigned to idle virtual tributaries.

According to a broader aspect of the present invention, there is provided a terminating station for a synchronous multiplex transmission network in which a frame of i rows and j columns is transmitted, the j columns of the frame being divided into k columns for carrying a transport overhead and m columns for carrying an information payload, the m columns being subdivided into k groups of n columns each, each of the corresponding n columns of each group carrying a virtual tributary traffic. In the terminating station, a virtual tributary path idle (VTPI) pulse sequence is generated and inserted into the k columns of a frame of the formal A timeslot interchanger provides timeslot interchanging within the frame and writes contents of the k columns of the frame into one or more of the n columns of the k groups, respectively, of the frame.

According to a specific aspect, the terminating station of this invention comprises a controller, a plurality of transport overhead extraction circuits for extracting transport overheads from incoming frames and supplying the extracted transport overheads to the controller, and a plurality of virtual tributary path idle (VTPI) insertion circuits connected respectively to outputs of the transport overhead extraction circuits, each of the VTPI circuits generating a virtual tributary path idle (VTPI) pulse sequence and inserting the VTPI pulse sequence into the k columns of the frame. A switching network has inlet terminals connected respectively to the VTPI insertion circuits for receiving frames therefrom and provides timeslot interchange within a frame from the VTPI insertion circuits, and provides timeslot interchange between an incoming frame appearing at one of the inlet terminals and an outgoing frame appearing at one of the outlet terminals. The switching network writes contents of the k columns of one of the incoming and outgoing frames into one or more of the n columns of the k groups, respectively, of the frame. A plurality of transport overhead insertion circuits are coupled respectively to the outlet terminals of the switching network for rewriting the k columns of each frame from the switching network with a transport overhead supplied from the controller.

BRIEF DESCRIPTION OF THE DRAWINGS

The present invention will be described in further detail with reference to the accompanying drawings, in which:

FIG. 1 is a block diagram of a terminating station of a synchronous optical network according to the present invention;

FIG. 2 is a block diagram of a VTPI insertion circuit;

FIGS. 3A to 3D show contents of the transport overheads of several frames of a multiframe structure when they are inserted by VTPI insertion circuit.

DETAILED DESCRIPTION

Figure 4A:
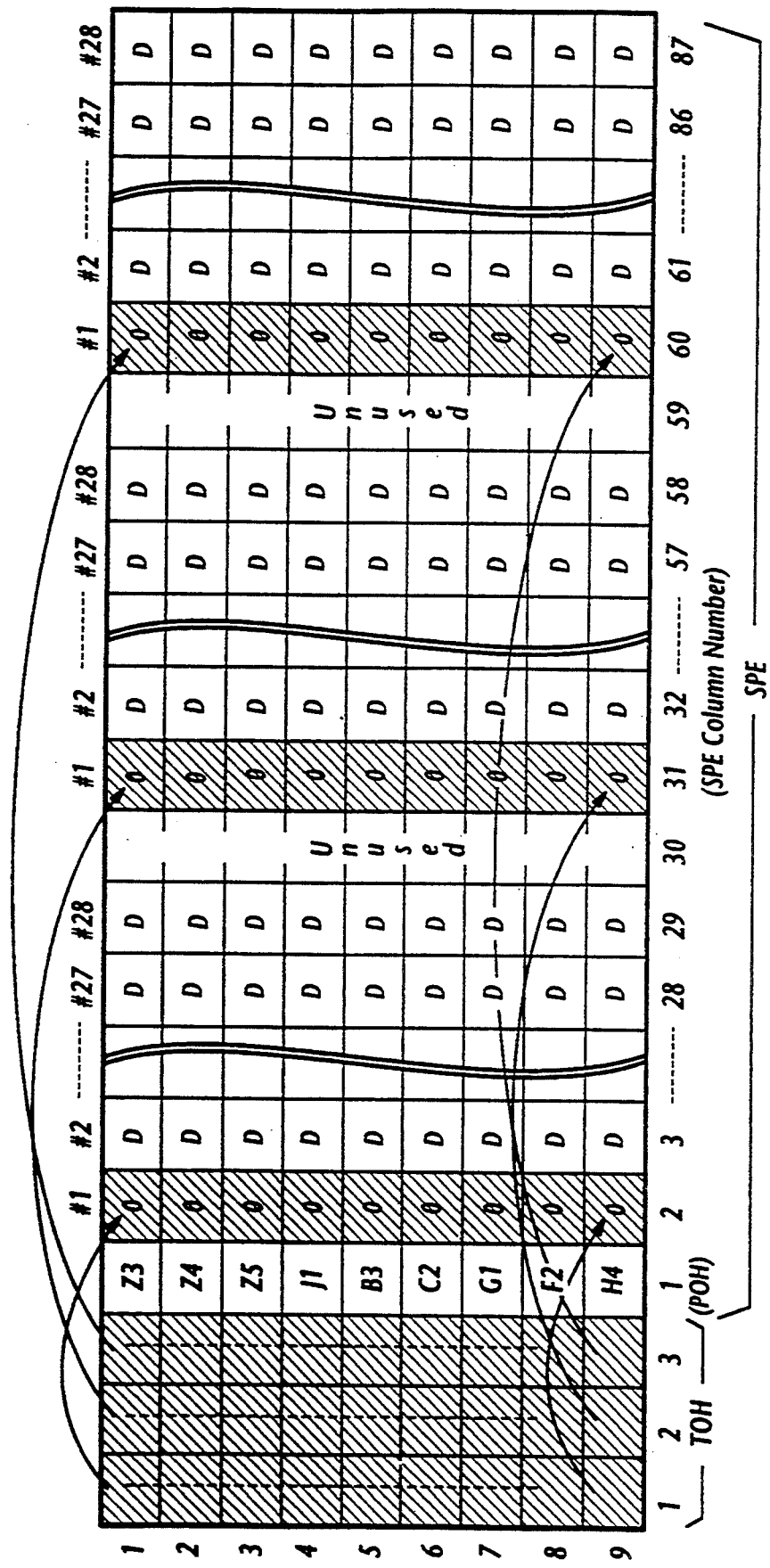
FIG. 4A shows an STS-1 frame in which the VTPI-containing columns of each frame are transferred to several columns of the synchronous payload envelope (SPE) by the TST switch.

Referring now to FIG. 1, there is shown a line terminating station of a synchronous optical network (SONET) according to the present invention. As illustrated, the line terminating station of this invention comprises a plurality of optoelectric converters 1 to which incoming fiber optic transmission lines are respectively terminated. Each optoelectric converter receives an optical signal level-1 (OC-1) and translates it into a corresponding electrical signal known as synchronous transport signal level-1 (STS-1). According to the frame format of the STS-1 signal, each frame consists of 9 rows of 90 bytes (columns) each and the first to third columns of the frame are occupied by a transport overhead, and the remaining 87 columns of the frame is known as a synchronous payload envelope (SPE) to carry 87×9 bytes of STS-1 information payload including a column of path overhead (POH).

The outputs of O/E converters 1 are coupled respectively to corresponding TOH (transport overhead) extraction circuits 2 which are associated with an operations (synchronization), administration and maintenance (OAM) controller 7. Each TOH extraction circuit 2 reads a transport overhead out of the first to third columns of the incoming STS-1 frame into the OAM controller 7 for network operations, administration and maintenance purposes and reads an STS information payload out of the remaining columns of the frame.

According to this invention, virtual tributary path idle (VTPI) insertion circuits 3 are provided corresponding to TOH extraction circuits 2. Each VTPI insertion circuit 3 is connected to the output of the corresponding TOH extraction circuit 2 to receive the STS information payload bytes. The output of each VTPI insertion circuit 3 is connected to one of inlet terminals of a time-space-time switch 4 (or digital cross-connect switch or add-drop multiplexer). To the outlet terminals of the switch 4 are connected TOH insertion circuits 5 whose outputs are connected via electrooptic converters 6 to outgoing fiber optic transmission lines. Each of the TOH insertion circuit 5 is associated with the OAM controller 7 to permit insertion of a transport overhead into an outgoing STS-1 frame.

In a well known manner, TST switch 4 provides timeslot interchange within each incoming frame (where the timeslot is defined as a slot for carrying a byte of data and identified by a particular row and a particular column of the frame), provides space switching on a timeslot basis between the inlet terminals and outlet terminals of the switch to form outgoing STS-1 frames, and provides timeslot interchange within each outgoing frame. Switching control signals for this purpose are supplied from the OAM controller 7.

As shown in FIG. 2, each VTPI insertion circuit 3 comprises a data buffer 10, a VTPI generator 11, a selector 12 and a timing circuit 13. Each frame from the corresponding TOH extraction circuit 2 is stored into buffer 10 and supplied to selector 12 under control of timing circuit 13. A VTPI (virtual tributary path idle) pulse sequence is generated by VTPI generator 11 in response to a timing signal from circuit 13 and applied to selector 12 where it is combined with the information payload to form an STS-1 frame. Selector 12 receives TOH timing pulses from timing circuit 13 to insert the VTPI bit sequence into one of the timeslots of the transport overhead of each frame and 0-bit sequences into the other timeslots of the transport overhead. Typical examples of transport overheads for multiframe transmission are shown in FIG. 3A to 3D, where a path overhead byte J1 indicates 64-kbps channel used to repetitively send a 64-byte fixed-length string so a receiving terminal can continuously verify the integrity of a path, and a path overhead byte H4 is a multiframe indicator for payloads needing frames that are longer than a single STS frame when packing lower rate channels (virtual tributaries) into the SPE. $V_1$, $V_2$, $V_3$ and $V_4$ are virtual tributary path idle sequences, and where $V_1$ is typically represented by a sequence of "01101100" and $V_2$, $V_3$ and $V_4$ are set equal to all zero's.

To facilitate the transport of lower rate digital signals, the SONET standard uses sub-STS-1 payload mappings referred to as virtual tributary (VT) structure as shown in FIG. 4A. This mapping divides the SPE field of each STS-1 frame into 7 subframes or VT blocks with 12 columns in each so that the subframes account for 84 columns plus one column for the path overhead (column number 1) and two unused columns (column numbers 30 and 59). The 84 columns are therefore partitioned by the unused columns into three groups of 28 columns each, with the first group accounting for column numbers 2 to 29, the second group for column numbers 31 to 58, and the third group for column numbers 60 to 87. Corresponding 28 columns of different groups are assigned to virtual tributaries #1 through #28, respectively.

Figure 4B:
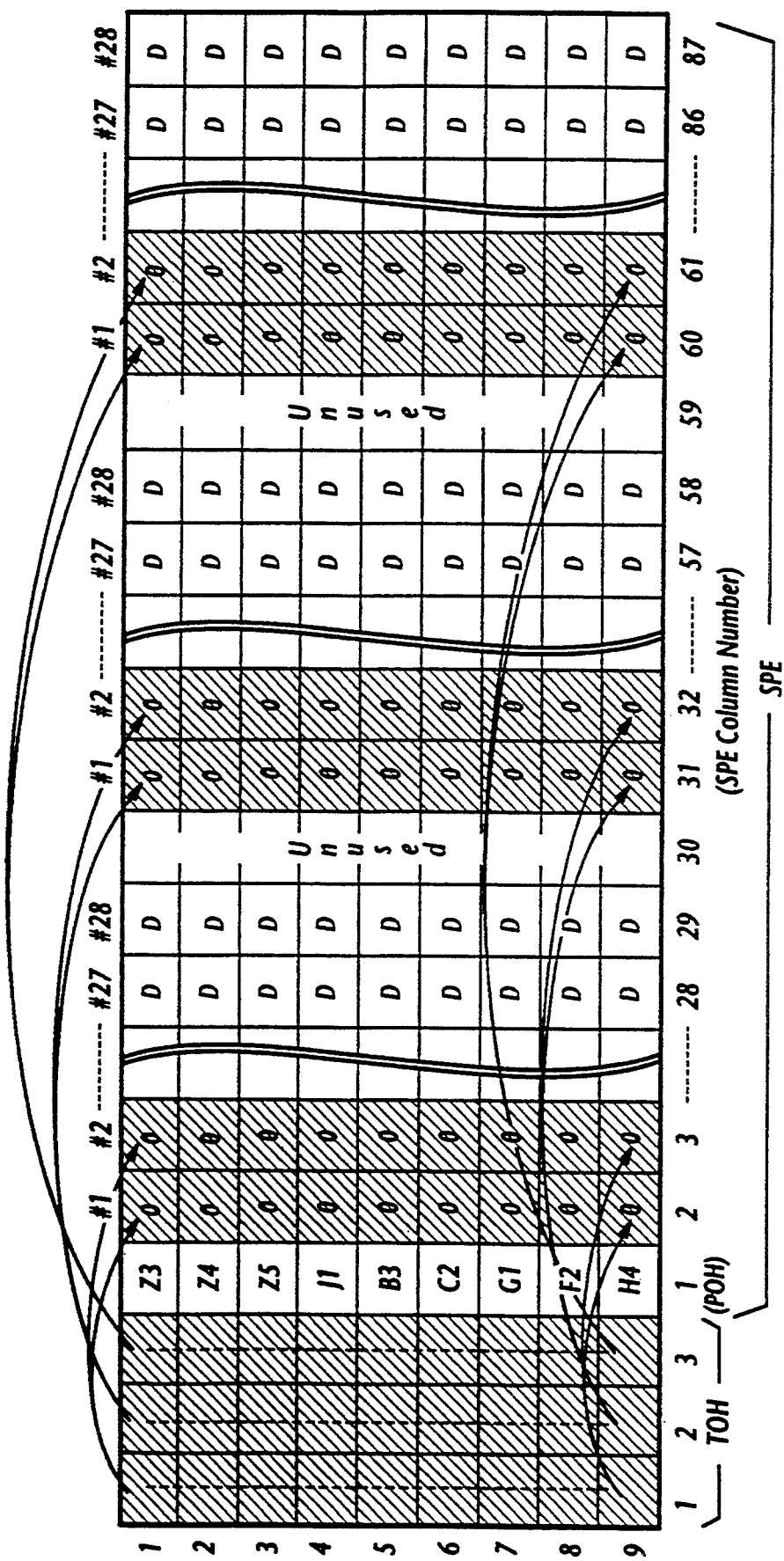
FIG. 4B shows another STS-frame in which the VTPI-containing columns of the frame are copied to several columns of the SPE using a multicast function.

According the present invention, the OAM controller 7 controls the TST switch 4 to provide timeslot interchange on the incoming STS-1 frame with a VTPI contained in its transport overhead by copying the contents of the transport overhead to idle virtual tributary columns of the SPE field. If virtual tributary #1 is idle, the contents of the first, second and third columns of the transport overhead are copied into the virtual tributary columns #1, i.e., column numbers 2, 31 and 60, respectively, of the SPE field, as indicated by hatchings and arrows in FIG. 4A. If more than one virtual tributary is idle, a multicasting function of the TST switch is used to advantage. For example, if virtual tributaries #1 and #2 are idle, The contents of the first, second and third columns of the transport head are copied into the virtual tributary columns #1 and #2 of the first, second and third groups, respectively, as shown in FIG. 4B. After the usual switching processes, VTPI-containing STS-1 frames appear at appropriate TOH insertion circuits 5 where their transport overheads are overwritten with new TOH bytes supplied from the OAM controller 7.

It is seen from the foregoing that the present invention takes advantage of the timeslot switching function of a digital cross-connect switch or add-drop multiplexer for copying or writing the contents of the first to third columns of an STS-1 frame into idle virtual tributaries.

What is claimed is:

1. A terminating station for a synchronous multiplex transmission network, wherein a frame of a plurality of rows and a plurality of columns is transmitted through the network, said columns being divided into a first field for carrying a transport overhead and a second field for carrying a plurality of virtual tributary path data, said rows and columns defining a plurality of timeslots, the terminating station comprising:
    a bit pattern generator for generating a virtual tributary path idle (VTPI) pulse sequence;
    means for receiving a frame and receiving said VTPI pulse sequence from said bit pattern generator and for inserting said VTPI pulse sequence into a portion of said first field of the frame and 0-bit sequences into other portions of said first field; and
    timeslot interchange means coupled to said means for receiving and inserting for interchanging timeslots of said frame, said timeslot interchange means being further effective for copying contents of said first field of said frame into at least one column of the second field of said frame where virtual tributary path data is not present.

2. A terminating station as claimed in claim 1, wherein said frame is a synchronous transport signal level 1.

3. A terminating station for a synchronous multiplex transmission network, wherein a frame of a plurality of rows and a plurality of columns is transmitted through the network, said columns being divided into a first field for carrying a transport overhead and a second field for carrying a plurality of virtual tributary path data, said rows and columns defining a plurality of timeslots, the terminating station comprising:
    a controller;
    a plurality of transport overhead extraction circuits, each of the transport overhead extraction circuits receiving an incoming frame and extracting a transport overhead (TOH) therefrom and supplying the extracted transport overhead to said controller;
    a plurality of virtual tributary path idle (VTPI) insertion circuits connected respectively to outputs of said transport overhead extraction circuits, each of the VTPI insertion circuits receiving a TOH-extracted frame from the corresponding TOH extraction circuit, each of the VTPI circuits generating a virtual tributary path idle (VTPI) pulse sequence and inserting said VTPI pulse sequence into a portion of said first field and 0-bit sequences into other portions of said first field and producing a VTPI-containing frame, and producing a frame not containing said VTPI when all columns of the second field of the received frame carry virtual tributary path data;

a switching network having a plurality of inlet terminals connected respectively to said VTPI insertion circuits and a plurality of outlet terminals, said switching network being responsive to a control signal from said controller for providing timeslot interchanging on the VTPI-containing frame and on the frame not containing the VTPI, and switching the timeslot-interchanged frames to said outlet terminals, said switching network being further effective for copying contents of the first field of the VTPI-containing frame into at least one column of the second field of the VTPI-containing frame where virtual tributary path data is not present; and a plurality of transport overhead insertion circuits coupled respectively to the outlet terminals of said switching network for rewriting the first field of each of frames from the switching network with a transport overhead supplied from said controller.

4. A terminating station as claimed in claim 3, wherein the incoming frame received by each of said transport overhead extraction circuits is a synchronous transport signal level-1.

* * * * *